Feb. 8, 1955  B. R. McBATH  2,701,648
EQUALIZATION OF PRESSURE ON THE ROLLERS
IN A TURNING ROLL BY HYDRAULIC MEANS
Filed Jan. 4, 1950  4 Sheets-Sheet 1
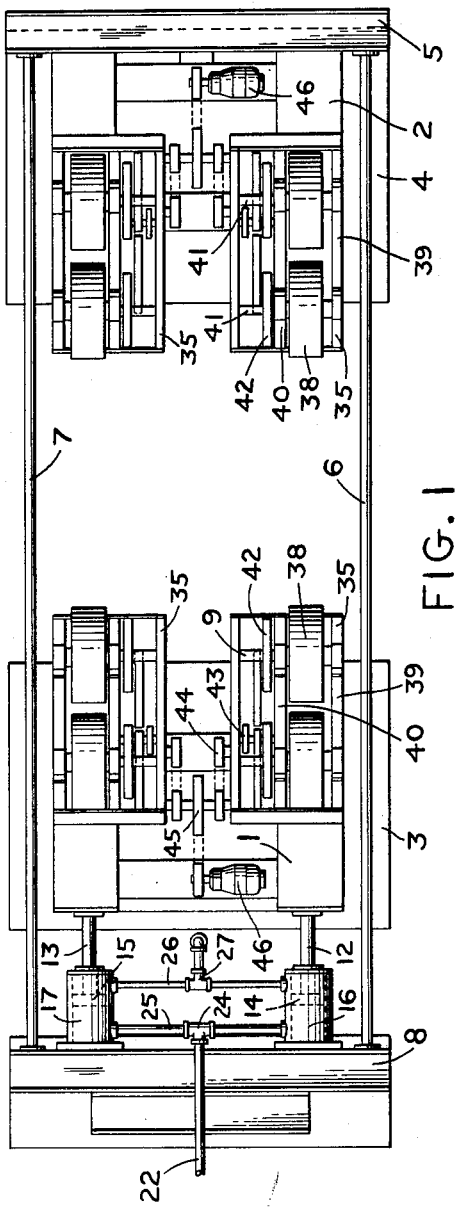
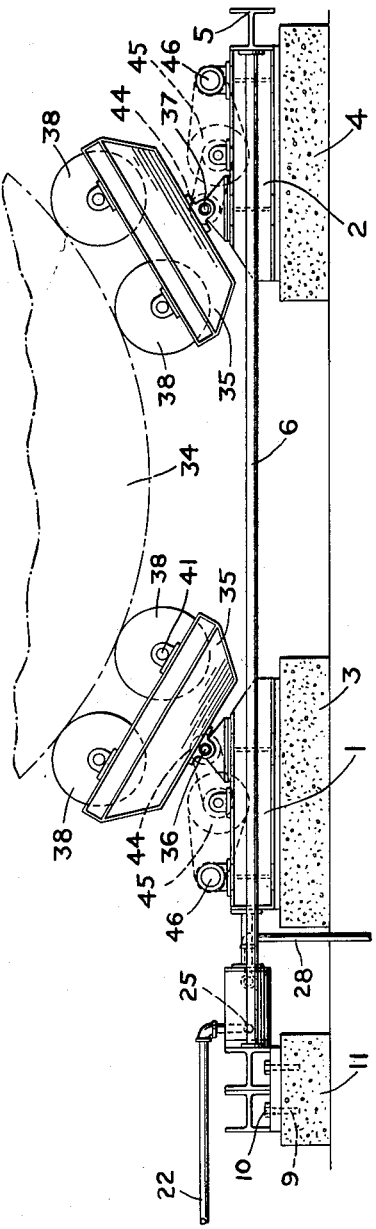
BARTLEY R. McBATH
*INVENTOR.*
BY *[signature]*
*attorney*

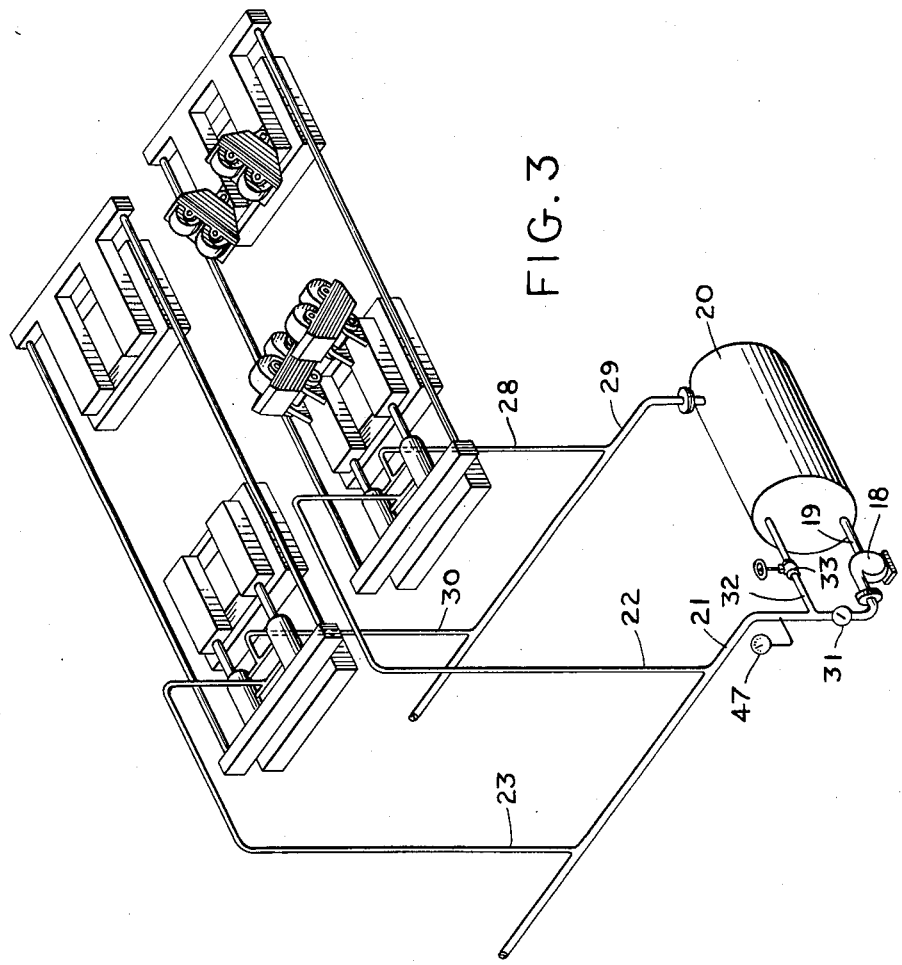

Feb. 8, 1955    B. R. McBATH    2,701,648
EQUALIZATION OF PRESSURE ON THE ROLLERS
IN A TURNING ROLL BY HYDRAULIC MEANS
Filed Jan. 4, 1950    4 Sheets-Sheet 3

BARTLEY R. McBATH
*INVENTOR.*
BY [signature]
*attorney*

BARTLEY R. McBATH
INVENTOR.

United States Patent Office 2,701,648
Patented Feb. 8, 1955

2,701,648

EQUALIZATION OF PRESSURE ON THE ROLLERS IN A TURNING ROLL BY HYDRAULIC MEANS

Bartley R. McBath, Glen Ridge, N. J., assignor to Worthington Corporation, Harrison, N. J., a corporation of Delaware Application January 4, 1950, Serial No. 136,682

9 Claims. (Cl. 214—1)

This invention relates generally to turning rolls and more specifically to the equalization of the load on each of the rollers, by actuating the members to which the rollers are attached, by hydraulic pressure.

For facilitating operations, for example, welding, on large cylindrical objects such as drums and tanks, turning rolls have been developed consisting substantially of spaced rollers to support the cylindrical objects wherein one or more of the rollers are motor driven to rotate the cylindrical object automatically. Where the cylindrical object is very large and very heavy a series of rollers may be required.

It has been found in those instances where the cylindrical objects have irregularities or protuberances on the outer surface that a greater portion of the weight will be cast onto one or a relatively small number of rollers which often results in breakdowns requiring the stoppage and replacement of the rollers.

The present invention contemplates a turning roll or a series of turning rolls which have the rollers mounted on one or more movable members actuated by a hydraulic pressure system whereby when excess pressure is cast onto one or a relatively few rollers it will be passed undiminished through the hydraulic system by the action of the movable member against the hydraulic fluid to distribute the excess pressure equally to all the rollers.

Accordingly, an object of the present invention is to provide a turning roll which is provided with hydraulically actuated support members.

It is another object of the present invention to provide a system which will allow the excessive pressure cast on any one roller of a turning roll to be distributed equally and undiminished to the remaining rollers through a hydraulic pressure system.

With these and other objects in view, as may appear from the accompanying specification, the invention consists of various features of construction and combination of parts, which will be first described in connection with the accompanying drawings, showing equalization of pressure on the rollers in a turning roll by hydraulic means of a preferred form embodying the invention, and the features forming the invention will be specifically pointed out in the claims.

In the drawings:

Figure 1 is a top view of a turning roll.

Figure 2 is a side view of a turning roll showing a cylindrical object mounted therein.

Figure 3 is a diagrammatic sketch showing a system wherein more than one set of turning rolls are connected in the hydraulic system.

Figure 5:
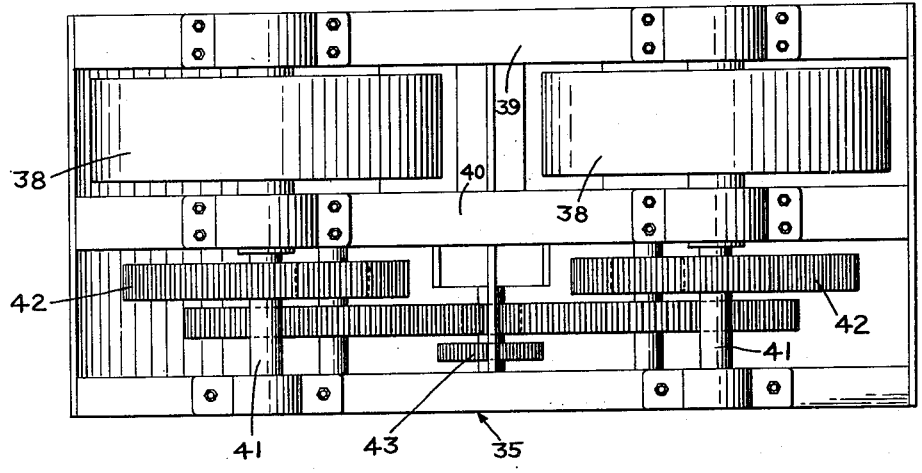
Figure 5 is a top view of a roller housing showing the rollers and the driving gear thereon.
Figure 4:
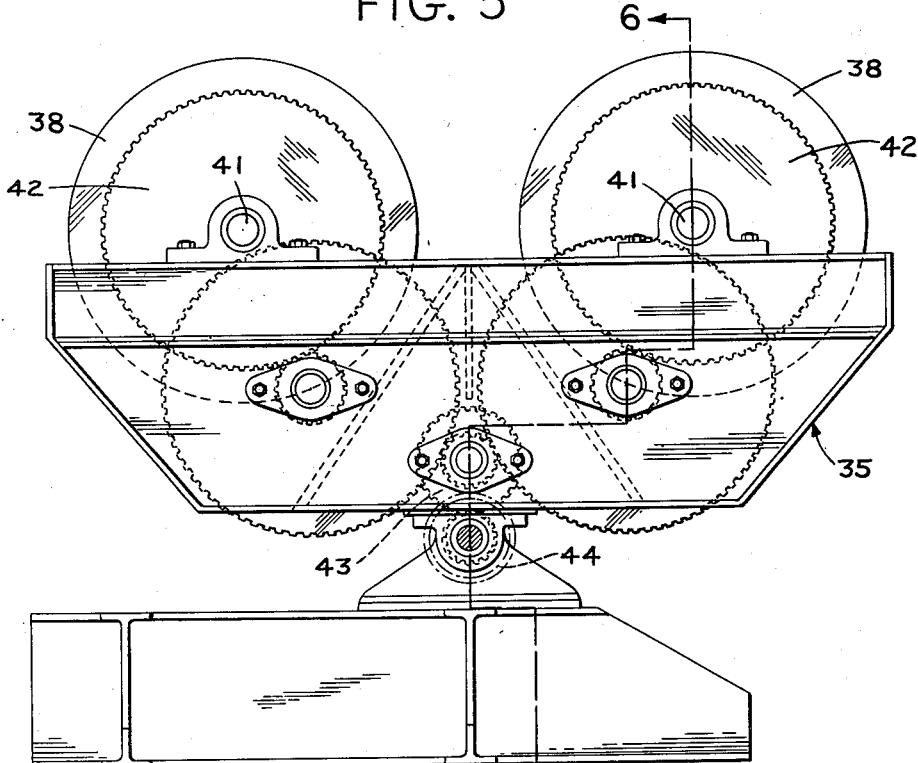
Figure 4 is a side view of a roller housing showing the rollers and the driving gear thereon.
Figure 6:
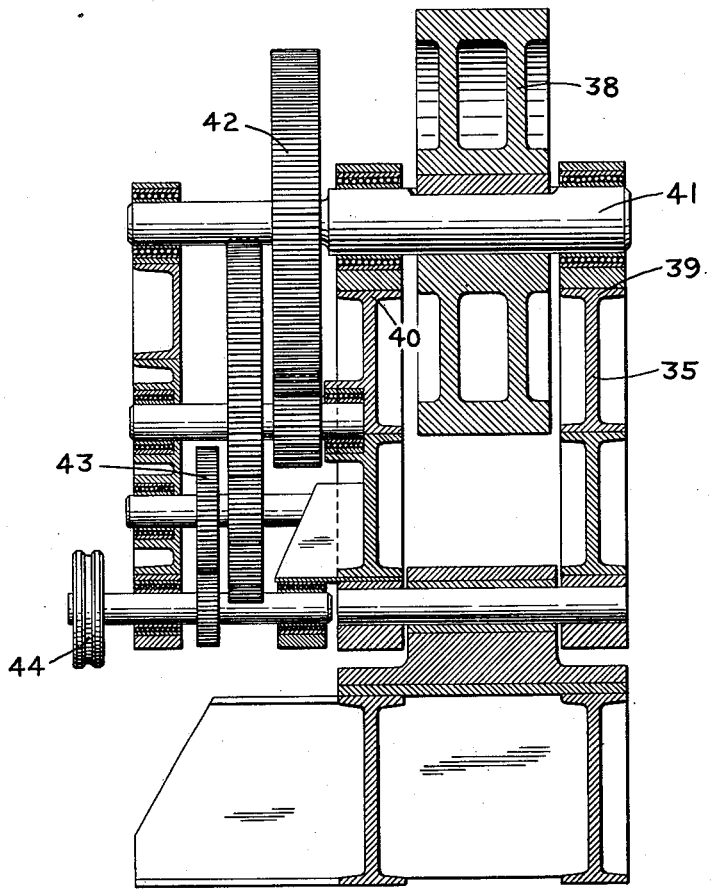
Figure 6 is a cross-section of the roller housing taken on line 6—6 of Figure 4.

Referring to the drawings, Figures 1 and 2 show a turning roll having a movable bed 1 and a fixed bed 2 in spaced relationship to each other and mounted on sole plates 3 and 4, respectively. Movable bed 1 is slidable on the sole plate 3 as will be hereinafter described and, accordingly, a suitable lubricant is placed on the surface of the sole plate 3 in contact with the bed 1 to reduce the frictional engagement between these members.

Fixed bed 2 is held in position on its respective sole plate 4 by a cross-bar member 5 fixedly connected to the rearward portion and extending past either side thereof so that one end of tie-rods 6 and 7 may be mounted to these extended portions. The tie-rods 6 and 7 in turn extend alongside the beds 1 and 2 in substantially the horizontal plane thereof and are fixedly connected at the other end thereof to an anchor structure 8 firmly embedded by means of anchor bolts 9 and nuts 10 to a concrete base 11, all of which is clearly shown in Figures 1 and 2 of the drawings.

Movable bed 1 is slidably connected to the anchor structure 8 by means of piston rods 12 and 13 having pistons 14 and 15 connected thereto which are in turn slidably mounted for actuation by hydraulic fluid in their respective hydraulic cylinders 16 and 17 which are fixedly mounted to the anchor structure 8 by suitable means such as welding or nuts and bolts (not shown).

Hydraulic fluid is supplied to the hydraulic cylinders 16 and 17 by a system diagrammatically illustrated in Figure 3 of the drawings, at some predetermined pressure suitable for the equalization of load by the movable member as hereinafter described.

Thus, Figure 3 shows a pump 18 which may be of any suitable type either electrical, manual, or other type of operation easily purchasable on the open market which has its intake conduit 19 connected to hydraulic reservoir 20. The outlet conduit 21 is a common duct from which individual turning roll supply conduits 22 and 23 are led off to conduct hydraulic fluid under pump pressure to their respective set of turning rolls.

Thus, referring to Figures 1 and 2, conduit 22 is shown connected by means of T-coupling 24 to a common supply pipe 25 connected between and opening into hydraulic cylinders 16 and 17 whereby the pumped fluid will be delivered directly into the cylinder 16 and 17 to actuate the pistons 14 and 15 respectively. Hydraulic fluid which leaks past pistons 14 and 15 is passed into a common return pipe 26 also connected between the hydraulic cylinders 16 and 17 but at the end away from the position of the common supply pipe 25.

Common return pipe 26 is in turn connected by means of a second T-coupling 27 to its respective return conduit 28 whence the fluid being returned is passed into a common return duct 29 connected and opening into the reservoir 20. Other return conduits, for example, conduits 30 shown in Figure 3 also are connected to return duct 29 from their respective turning rolls to return the operating fluid in similar fashion.

As shown in Figures 1 and 2, the common return pipe 26 is positioned past the actuating portions of cylinders 16 and 17 or outwardly of the pistons 14 and 15 and thus merely acts to return fluid which leaks past the piston members. The common return pipe 26 may be positioned along the cylinders 16 and 17 (not shown) to act as an overflow member in conjunction with a continuous acting pump whereby both the distance the piston will travel and the pressure the system will operate at may be regulated relative to the weight of the cylindrical object being handled by the turning rolls.

Check valve 31 on the outlet 21 clearly shown in Figure 3, is adjusted to secure a predetermined pressure in the lines for actuating the pistons 14 and 15 and the movable bed 1. The shut-off return conduit 32 having a globe valve 33 connected therein is connected between the outlet conduit 21 and the reservoir 20 to return hydraulic fluid from the outlet side of the pump to the reservoir 20.

Means for supporting and rotating a cylindrical object 34, only a fragment of which is shown in Figure 2, is mounted on the beds 1 and 2, in a series of tub-like roller housings 35, substantially identical in construction which are pivotally mounted as at 36 and 37, clearly shown in Figure 2 of the drawings.

Each of the roller housings 35 are provided with rollers 38 rotatably mounted on the outer edges 39 and central longitudinal supports 40 by means of shafts 41 fixedly connected and passing through each roller. Attached to the inner end of the shafts 41 are driven gears 42 which are connected by means of reducing gears 43, 44, and 45 to a suitable prime mover 46, such as a constant speed motor easily purchasable on the open market.

In operation, globe valve 33 is closed so that hydraulic fluid cannot pass from the outlet conduit 21 to the reservoir 20 through the stop return conduit 32. Thereafter the pump is started and operated to maintain a desired pressure which is indicated on the pressure gauge 47 shown in Figure 3 on the outlet conduit 21, whereby hydraulic fluid at a fixed pressure will actuate all of the piston members of the respective turning rolls and accordingly cause the movable beds thereof to move inwardly towards the fixed bed members. More specifically in Figures 1 and 2, pistons 14 and 15 will be actuated, moving piston rods 12 and 13 and accordingly movable bed 1 connected thereto inwardly towards fixed bed 2.

Any cylindrical object may be hoisted by suitable means (not shown) and placed between the spaced beds of the several turning rolls as shown in Figure 3 until they are brought into contact with the rollers in the roller housings. This will cause the movable beds to move outwardly away from the fixed beds a short distance until the rollers are in firm contact with the cylindrical object.

More specifically referring to Figure 2 of the drawings, the cylindrical object 34 is shown in intimate contact with the rollers 38 due to the automatic pivoting of the roller housing 35 around the pivoting points 36 and 37, and the slight outward movement of the movable bed 1 away from the fixed bed 2. It being understood that while this specific turning roll is described that it refers to all turning rolls utilized with the hydraulic system thereon.

The cylindrical object may now be easily rotated by starting the respective prime movers 46, the speed and rate of rotation being controlled in accordance with the ratio of the reduction gears 45, 44 and 43, respectively, engaging the driven gear 42 connected to the shaft 41 in which the rollers 38 are mounted.

As long as there are no irregularities on the cylindrical object, there will be no fluctuation in the hydraulic fluid and the cylindrical object will not cast any undue load on any particular roller. However, where an irregularity occurs, the pressure will either be increased or decreased on the movable beds of the turning rolls depending on which roller or rollers are carrying the load.

If the pressure, i. e., the load, is increased it will cause the movable member against which it is acting to move inwardly, this pressure being passed undiminished through the hydraulic fluid to all the other movable beds, causing them in turn to move inwardly to take or shift the load equally.

Contrariwise, if the pressure, i. e., the load, is reduced on a movable member the fluid acting will cause the movable member to move outwardly until its respective rollers contact the cylindrical object, thus allowing the rollers to assume their respective portions of the load.

While one form of the invention has been illustrated and described, it is obvious that the invention is not to be limited to the specific construction or arrangement of parts shown, but that they may be widely modified within the invention defined by the claims.

What is claimed is:

1. In a system for rotating objects, a plurality of turning rolls disposed in substantially parallel alignment, each of said turning rolls to include one movable bed and one fixed bed in spaced relation to each other, rollers on each of said beds disposed to rotatably support objects therebetween, means for rotating said rollers, an anchor structure for each turning roll including spaced support members, means connecting each fixed bed to the remote end of the spaced support members of its respective turning roll, the other end of said anchor structure for each turning roll having hydraulic means connected thereto and to the movable bed for said turning roll to position said movable bed towards and away from its respective fixed beds for equalization of pressure between said rollers.

2. In a system for rotating objects, a plurality of turning rolls disposed in substantially parallel alignment, each of said turning rolls to include one movable bed and one fixed bed in spaced relation to each other, rollers on each of said beds disposed to rotatably support objects therebetween, means for rotating said rollers, an anchor structure for each turning roll including spaced support members, means connecting each fixed bed to the remote end of the spaced support members of its respective turning roll, the other end of said anchor structure for each turning roll having hydraulic means connected thereto and to the movable bed for said turning roll to position said movable bed towards and away from its respective fixed beds for equalization of pressure between said rollers, and conduit means connecting said hydraulic means of the respective turning rolls for equalizing and dissipating excess pressure conveyed to said movable beds due to excess load on any of said rollers.

3. In a system for rotating objects as claimed in claim 2 wherein said hydraulic means includes at least one cylinder fixedly connected to said anchor structure remote from said fixed bed, a piston slidably mounted in said cylinder and provided with a piston rod connected thereto, the other end of said piston rod connected to said movable bed so that hydraulic fluid actuating said piston will move said movable bed and excess pressure on said movable bed will act on said hydraulic fluid through said piston rod and piston.

4. In a system for rotating objects as claimed in claim 2 wherein the means connecting said fixed bed to the remote end of the spaced supports includes cross bar members fixedly connected to said fixed bed, parallel tie-rods connected to said cross bars at one end thereof and to said anchor support members at the other end thereof whereby the position of said fixed bed is fixed.

5. In a system for rotating objects, a plurality of turning rolls having their longitudinal axes substantially parallel to each other, each turning roll to include one movable bed and one fixed bed in spaced relation to each other and disposed along said longitudinal axes, rollers, means for mounting said rollers on said bed to rotatably support objects therebetween, means for rotating said rollers, an anchor structure provided for each of said turning rolls, means connecting each fixed bed to the remote end of the anchor structure of its respective turning roll, the other end of said anchor structure for each turning roll having hydraulic means connected thereto and to the movable bed for said turning roll to position said movable bed towards and away from its respective fixed bed for equalizing of pressure between said rollers.

6. In a system for rotating objects as claimed in claim 5 wherein said means for mounting said rollers on said beds includes, tub-like elements, said tub-like elements pivotally connected to each of said beds, and bearing supports in said tub-like elements to carry said rollers.

7. In a system for rotating objects, a plurality of turning rolls having their longitudinal axes substantially parallel to each other, each turning roll to include one movable bed and one fixed bed in spaced relation to each other and disposed along said longitudinal axes, rollers, means for mounting said rollers on said beds to rotatably support objects therebetween, means for rotating said rollers, an anchor structure for each of said turning rolls including spaced support members, means connecting the fixed bed to the remote end of the spaced supports of its respective turning roll, the other end of said anchor structure for each turning roll having hydraulic means connected thereto and to the movable bed for said turning roll to position said movable bed towards and away from its respective fixed beds for equalization of pressure between said rollers.

8. In a system for rotating objects, a plurality of turning rolls having their longitudinal axes substantially parallel to each other, each turning roll to include one movable bed and one fixed bed in spaced relation to each other and disposed along said longitudinal axes, rollers, means for mounting said rollers on said beds to rotatably support objects therebetween, means for rotating said rollers, an anchor structure for each of said turning rolls including spaced support members, means connecting the fixed bed to the remote end of the spaced supports of its respective turning roll, the other end of said anchor structure for each turning roll having hydraulic means connected thereto and to the movable bed for said turning roll to position said movable bed towards and away from its respective fixed beds for equalization of pressure between said rollers, and conduit means connecting said hydrauilc means for each of said turning rolls for equalizing and dissipating excess pressure conveyed to the respective movable beds of said turning rolls due to excess load on any of said rollers.

9. In a system for rotating objects as claimed in claim 8 wherein the means connecting said fixed bed to the remote end of the spaced support includes cross bar members fixedly connected to said fixed beds, parallel tie-rods connected to said cross bar members at one end thereof and to said spaced supports at the other end thereof whereby the position of said fixed bed is fixed.

References Cited in the file of this patent

UNITED STATES PATENTS

| Number | Name | Date |
|---|---|---|
| 1,870,760 | Tipton | Aug. 9, 1932 |
| 2,287,197 | Sandberg | June 23, 1942 |
| 2,500,204 | Ronay | Mar. 14, 1950 |